United States Patent [19]
Schrader et al.

[11] 3,884,999
[45] May 20, 1975

[54] O-ALKYL-S-[3-METHYL-BUTEN-(2)-YL]-(THIONO)THIOL-PHOSPHORIC-(PHOSPHONIC) ACID ESTERS

[75] Inventors: Gerhard Schrader, Wuppertal Cronenberg; Ingeborg Hammann, Cologne, both of Germany

[73] Assignee: Bayer Aktiengesellschaft, Leverkusen, Germany

[22] Filed: Aug. 15, 1973

[21] Appl. No.: 388,678

[30] Foreign Application Priority Data
Aug. 26, 1972 Germany.............................. 2242097

[52] U.S. Cl.................................. 260/956; 424/219
[51] Int. Cl............................. C07f 9/16; A01n 9/36
[58] Field of Search..................................... 260/956

[56] References Cited
UNITED STATES PATENTS
2,394,829  2/1946  Whitehill et al. ............... 260/956 X
3,208,943  9/1965  Kirby ............................... 260/956 X
3,662,034  5/1972  Oswald et al. .................. 260/956 X

*Primary Examiner*—Anton H. Sutto
*Attorney, Agent, or Firm*—Burgess, Dinklage & Sprung

[57] ABSTRACT

O-alkyl-S-[3-methyl-buten-(2)-yl]-(thiono)thiolphosphoric-(phosphonic) acid esters of the formula

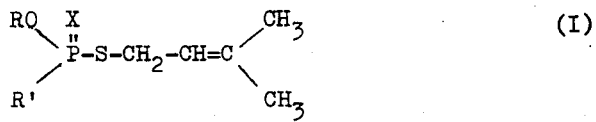

in which
R is lower alkyl,
R' is lower alkyl, lower alkoxy, lower alkylmercapto or phenyl, and
X is oxygen or sulfur,
which possess insecticidal and acaricidal properties.

7 Claims, No Drawings

O-ALKYL-S-[3-METHYL-BUTEN-(2)-YL]-(THIONO)THIOL-PHOSPHORIC-(PHOSPHONIC) ACID ESTERS

The present invention relates to and has for its objects the provision of particular new O-alkyl-S-[3-methyl-buten-(2)-yl]-(thiono)thiol-phosphoric-(phosphonic) acid esters, i.e. O,O-dialkyl- or O,S-dialkyl-S-[3-methyl-buten-(2)-yl]-thiol- or di-thiol-phosphoric acid esters, their alkyl- or phenyl-phosphonic acid counter parts, and their thiono analogues, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German Pat. specification 1,221,633 that amido-O-alkyl-S-propen-(propin)-yl-thiol-phosphoric acid esters are distinguished by a good insecticidal and acaricidal activity.

The present invention provides thiol- and thionothiolphosphoric-(phosphonic) acid esters of the general formula

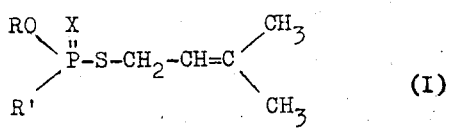

in which
R is lower alkyl,
R' is lower alkyl, lower alkoxy, lower alkylmercapto or phenyl, and
X is oxygen or sulfur.

Preferably, R is alkyl with one to four, especially one to three, carbon atoms, such as methyl, ethyl, n-propyl or iso-propyl, and R' is such a radical or is alkoxy or alkylmercapto, in each case with one to four, especially one to three, carbon atoms, for example methoxy, ethoxy, n-propoxy, methylmercapto, ethylmercapto, n-propylmercapto or iso-propylmercapto.

Surprisingly, the compounds according to the invention are distinguished, relative to the nearest comparable known compounds of analogous structure and identical type of action, by a substantially better insecticidal or acaricidal activity and/or substantially lower phytotoxicity; the compounds according to the invention thus represent a considerable enrichment of the art.

The invention also provides a process for the production of a compound of the abovementioned formula (I) in which a salt of a thiol- or thionothiol-phosphoric-(phosphonic) acid, of the general formula

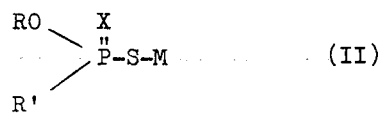

is reacted with 1-halogen-3-methyl-butene-2- of the formula

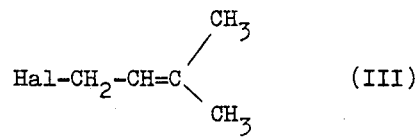

in which formulae R, R' and X have the abovementioned meanings, M is a monovalent metal equivalent, preferably an alkali metal atom or ammonium, and
Hal is halogen, preferably bromine.

The course of the preparative process can be represented by the following formula scheme:

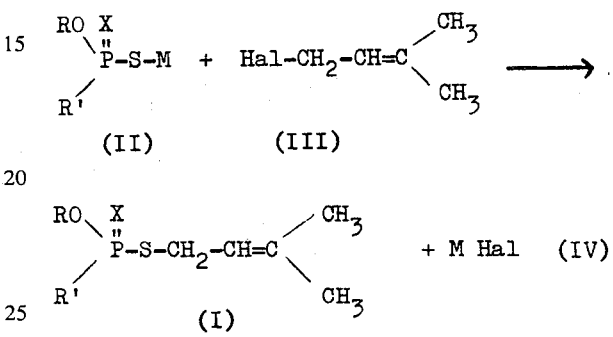

M is preferably a potassium, sodium or ammonium ion.

The preparation of the new compounds is preferably carried out in the presence of a solvent or diluent. For this purpose, polar organic solvents have proved particularly suitable, for example lower aliphatic ketones or nitriles, such as acetone, methyl ethyl ketone, methyl isopropyl ketone, acetonitrile and propionitrile.

It is furthermore advantageous, for the purpose of completing the reaction and thereby achieving good yeilds and obtaining pure products, to carry out the reaction at room temperature or slightly to moderately elevated temperature (20° to 80° C, preferably 50° to 80° C); and also to continue to stir the reaction mixture for a prolonged period, if necessary while heating, after bringing the reactants together.

The mixture may be worked up in a manner which is in principle known, by cooling the mixture to room temperature and then diluting the batch with an organic solvent. For this purpose, aliphatic or aromatic hydrocarbons which are optionally chlorinated have above all proved suitable, such as benzene, xylene, methylene chloride, chloroform, carbon tetrachloride, trichloroethane and tetrachloroethane. Thereafter, the solution may be washed with water and the organic layer dried. After drying the organic phase and evaporating the solvent under reduced pressure, the reaction product is in most cases left in the form of a colorless to slightly colored oil which can either be distilled or at least be freed of the last volatile impurities by briefly heating it to slightly or moderately elevated temperatures (40° to 80° C).

The salts of thiol- or thionothiol-phosphoric(phosphonic) acids of the general formula (II), required as starting materials for the preparation of the new substances, are known from the literature and can be prepared easily on an industrial scale.

The 1-halo (especially 1-bromo)-3-methyl-butene-2 compound (III) to be used as the second reactant is also obtainable in a manner which is in principle known, for example by addition of hydrogen halide to isoprene (compare G. Laber, Liebig's Annalen der Chemie, Volume 588 [1954], page 31).

As mentioned above, the thiol- and thionothiol-phosphoric-(phosphonic) acid esters according to the invention are distinguished by an excellent insecticidal and acaricidal action against sucking and biting insects, diptera and mites, for example aphids, spider mites, caterpillars and flies. The compounds possess both a very good contact-insecticidal action and an excellent systemic action. On the other hand, the new compounds only show a relatively low phytotoxicity.

Because of these properties, the products according to the invention may be used as pesticides, especially in plant protection, and against hygiene pests and pests of stored products.

To the sucking insects there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the browntail moth (*Euproctis chrysorrhoea*) and tent caterpillar (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kühniella*) and greater wax moth (*Galleria mellonella*)

Also to be classed with the biting insects are beetles (Coleoptera), for example the granary weevil (*Sitophilus granarius* = *Calandra granaria*), the Colorado beetle (*Leptino tarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (Bruchidius = *Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (Leucophaea or Phyparobia maderae), oriental cockroach (*Blatta orientalis*), the giant cockroach (*Blaberus giganteus*) and the black giant cockroack (*Blaberus fuscus*) as well as *Henschoutedenia flexivitta;* further, Orthoptera, for example the house cricket (*Acheta domesticus*); termites such as the eastern subterranean termites (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mites (Tetranychidae) such as the two-spotted spider mite (*Tetranychus urticae*) and the European red mite (*Paratetranychus pilosus* = *Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alimina, silica, chalk, i.e., calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g. average particle diameter of from 50–100 microns, or even less, i.e., mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid composition with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e., the locus to be protected, a correspondingly combative or toxic amount, i.e., an insecticidally or acaricidally effective amount, of the particular active compund of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

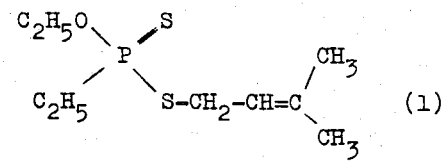

0.35 molar batch:

53 g of 1-bromo-3-methyl-butene-(2) (boiling point$_{55}$ 60°C) were added dropwise, while stirring vigorously, to a solution of 75 g of potassium ethyl-O-ethyl-thionothiolphosphonate in 300 ml of acetonitrile, at 25° to 30°C. The mixtue was then warmed for 1 hour to 60°C while continuing to stir. The batch was then cooled to room temperature. The reaction mixture was now mixed with 300 ml of benzene and after thorough mixing the benzene layer was separated off and washed repeatedly with 50 ml portions of ice water. The benzene solution was dried over sodium sulfate and the solvent was evaporated under reduced pressure. 70 g (84% of theory) of the ethyl-O-ethyl-S-[3-methyl-buten-(2)-yl]-thionothiolphosphonic acid ester were thus obtained as a pale yellow water-insoluble oil of refractive index $n_D^{22} = 1.5349$.

| Calculated for a molecular weight of 238: | found: |
|---|---|
| S 26.9%; | 26.5%, |
| P 13.0%; | 13.0%. |

EXAMPLE 2

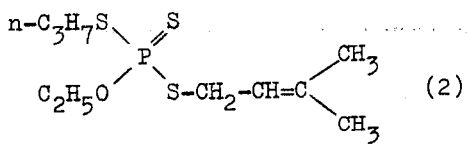

0.35 molar batch:

90 g of potassium O-ethyl-S-(n-propyl)-thionothiolphosphate were dissolved in 300 ml of acetonitrile. 53 g of 1-bromo-3-methyl-butene-(2) were added to this solution at 30° to 40°C, while stirring vigorously. The solution was then warmed to 60°C for a furher hour, while stirring, and was subsequently worked up as described in the preceding example. In this way, 82 g (82% of theory) of O-ethyl-S-(n-propyl)-S-[3-methyl-buten-(2)-yl]-thionodithiolphosphoric acid ester or refractive index $n_D^{22} = 1.5569$ were obtained.

| Calculated for a molecular weight of 284: | found: |
|---|---|
| S  33.8%; | 33.6%, |
| P  10.9%; | 11.1%. |

EXAMPLE 3

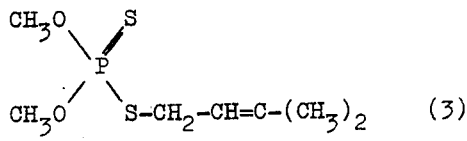

0.35 molar batch:

70 g of potassium O,O-dimethyl-thionothiolphosphate were dissolved in 300 ml of acetonitrile. 53 g of 1-bromo-3-methyl-butene-(2) were added dropwise to this solution at 25° to 30°C, while stirring, and the batch was stirred for a further hour at 60° to 65°C and was then worked up as described in the preceding examples. 56 g (71% of theory) of O,O-dimethyl-S-[3-methyl-buten-(2)-yl]-thionothiolphosphoric acid ester were thus obtained as a water-insoluble, yellow oil of refractive index: $n_D^{24} = 1.5293$.

| Calculated for a molecular weight of 226: | found: |
|---|---|
| S  28.3%; | 28.1%; |
| P  13.72%; | 13.8%. |

EXAMPLE 4

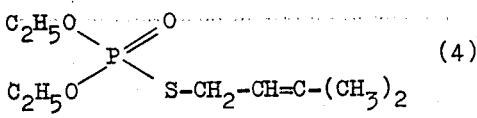

0.35 molar batch:

70 g of ammonium O,O-diethyl-thiolphosphate were dissolved in 300 ml of acetonitrile. 53 g of 1-bromo-3-methylbutene-(2) were added dropwise to this solution at 25° to 30°C, while stirring, and thereafter the reaction mixture was additionally warmed to 60°–70°C for 2 hours, while stirring, and was then worked up as in the preceding examples. 62 g (74% of theory) of O,O-diethyl-S-[3-methyl-buten-(2)-yl]-thiolphosphoric acid ester were thus obtained as a water-insoluble, pale yellow oil of refractive index: $n_D^{24} = 1.4780$.

| Calculated for a molecular weight of 238: | found: |
|---|---|
| S  13.44%; | 13.4%; |
| P  13.02%; | 12.9%. |

EXAMPLE 5

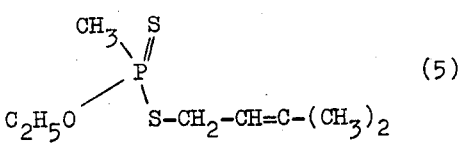

0.35 molar batch:

70 g of potassium methyl-o-ethyl-thionothiolphonate were dissolved in 300 ml of acetonitrile. 53 g of 1-bromo-3-methyl-butene-(2) were added dropwise to this solution at 30° to 40°C, while stirring, the mixture was subsequently additionally warmed to 60°C for 1 hour and then worked up as in the preceding examples, and 51.5 g (64% of theory) of methyl-O-ethyl-S-[3-methyl-buten-(2)-yl]-thionothiolphosphonic acid ester were obtained as a pale yellow, water-insoluble oil of refractive index: $n_D^{24} = 1.5339$.

| Calculated for a molecular weight of 224: | found: |
|---|---|
| S  28.6%; | 28.4%; |
| P  13.82%; | 13.7%. |

EXAMPLE 6

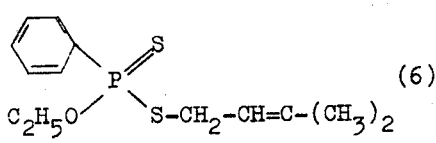

0.3 molar batch:

70 g of potassium phenyl-O-ethyl-thiono-thiolphosphonate were dissolved in 300 ml of acetonitrile. 45 g of 1-bromo-3-methyl-butene-(2) were added to this solution at 25°C while stirring, and the batch was additionally warmed to 60°–75°C for 1 hour and then worked up in the manner described in the preceding examples. 50 g (58% of theory) of phenyl-O-ethyl-S-[3-methyl-buten-(2)-yl-thionothiolphoshonic acid ester were obtained as a yellow, water-insoluble oil of refractive index: $n_D^{24} = 1.5818$.

| Calculated for a molecular weight of 286: | found: |
|---|---|
| S 22.37%; | 22.3%; |
| P 10.82%; | 10.8%. |

EXAMPLES 7 and 8

The compounds of the following formulae were obtained analogously:

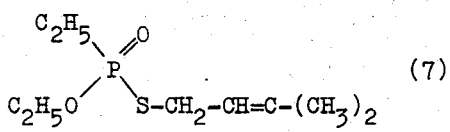

Yield: 73% of theory
Refractive index: $n_D^{24} = 1.5237$

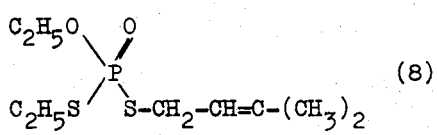

Yield: 76% of theory
Refractive index: $n_D^{24} = 1.5202$

Other compounds which can be similarly prepared include:

n-butyl-O-isopropyl-S-[3-methyl-buten-(2)-yl]-thionothiolphosphonic acid ester,
n-propyl-O-sec. butyl-S-[3-methyl-buten-(2)-yl]-thiolphosphonic acid ester,
O,S-diisobutyl-S-[3-methyl-buten-(2)-yl]-thionodithiolphosphoric acid ester
and the like.

In the biological examples 9–13 which follow, the compounds according to the invention, identified by numbers corresponding to those of the formulae in preparative Examples 1–8, were compared with known compounds of analogous structure and identical type of action with respect to the insecticidal and acaricidal activity, identified by letters corresponding to those of the following formulae:

(a) 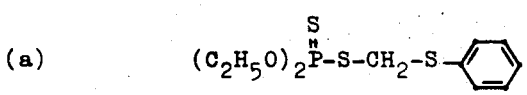

(b) 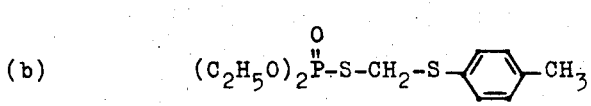

(c) 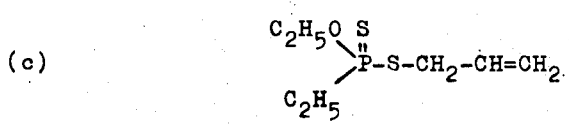

(d) 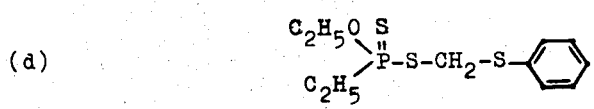

EXAMPLE 9

Drosophila test
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier, and the concentrate was diluted with water to the desired concentration.

1 ml of the preparation of the active compound was applied with a pipette to a filter paper disc of 7 cm diameter. The wet disc was placed in a glass vessel containing 50 vinegar flies (*Drosophila melanogaster*) and covered with a glass plate.

After the specified periods of time, the destruction was determined as a percentage: 100% means that all the flies were killed; 0% means that none of the flies were killed.

The active compounds, their concentrations, the evaluation times and the degree of destruction can be seen from the following Table 1.

Table 1

| Active compound | (Drosphila test) Active compound concentration in % | Degree of destruction in % after 1 day |
|---|---|---|
| (a) (known) | 0.1 | 90 |
|  | 0.01 | 0 |
| (b) (known) | 0.1 | 80 |
|  | 0.01 | 0 |
| (1) | 0.1 | 100 |
|  | 0.01 | 100 |
|  | 0.001 | 100 |
|  | 0.0001 | 100 |
| (2) | 0.1 | 100 |
|  | 0.01 | 100 |
|  | 0.001 | 100 |
| (3) | 0.1 | 100 |
|  | 0.01 | 100 |
|  | 0.001 | 100 |
| (5) | 0.1 | 100 |
|  | 0.01 | 100 |
|  | 0.001 | 100 |
| (7) | 0.1 | 100 |
|  | 0.01 | 100 |
|  | 0.001 | 95 |

EXAMPLE 10

Phaedon larvae test
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dripping wet and were infested with mustard beetle larvae (*Phaedon cochleariae*).

After the indicated times, the degree of destruction in % was determined. 100% means that all bettle larvae were killed. 0% means that no bettle larvae were killed.

The active compounds, the active compound concentrations, the evaluation times and the results can be seen from the following Table 10.

Table 10

| Active compound | (Phaedon larvae test) Active compound concentration in % | Degree of destruction in % after 3 days |
| --- | --- | --- |
| (c) (known) | 0.1 | 0 |
| (1) | 0.1 | 100 |
|  | 0.01 | 55 |
| (2) | 0.1 | 100 |
|  | 0.01 | 100 |
| (7) | 0.1 | 100 |
|  | 0.01 | 100 |

EXAMPLE 11

Plutella test

Solvent: 3 parts by weight of acetone

Emulsifier: 1 part by weight of alkylaryl polyglycol ether

To produce a suitable preparation of active compound, 1 part by weight of the active compound was mixed with the stated amount of solvent containing the stated amount of emulsifier and the concentrate was diluted with water to the desired concentration.

Cabbage leaves (Brassica oleracea) were sprayed with the preparation of the active compound until dew moist and were then infested with caterpillars of the diamond-back moth (Plutella maculipennis).

After the specified periods of time, the degree of destruction was determined as a percentage: 100% means that all the caterpillars were killed whereas 0% means that none of the caterpillars were killed.

The active compounds, the concentrations of the active compounds, the evaluation times and the results can be seen from the following Table 3.

Table 3

| Active compound | (Plutella test) Active compound concentration in % | Degree of destruction in % after 3 days |
| --- | --- | --- |
| (a) (known) | 0.1 | 60 |
|  | 0.01 | 0 |
| (b) (known) | 0.1 | 90 |
|  | 0.01 | 0 |
| (c) (known) | 0.1 | 100 |
|  | 0.01 | 0 |
| (d) (known) | 0.1 | 100 |
|  | 0.01 | 0 |
| (1) | 0.1 | 100 |
|  | 0.01 | 100 |
| (2) | 0.1 | 100 |
|  | 0.01 | 100 |
|  | 0.001 | 100 |
| (5) | 0.1 | 100 |
|  | 0.01 | 100 |
| (7) | 0.1 | 100 |
|  | 0.01 | 100 |
| (6) | 0.1 | 100 |
|  | 0.01 | 100 |

EXAMPLE 12

Myzus test (contact action)

Solvent: 3 parts by weight of acetone

Emulsifier: 1 part by weight of alkylaryl polyglycol ether

To produce a suitable preparation of active compound, 1 part by weight of the active compound was mixed with the stated amount of solvent containing the stated amount of emulsifier and the concentrate was diluted with water to the desired concentration.

Cabbage leaves (Brassica oleracea) which had been heavily infested with peach aphids (Myzus persicae) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 4.

Table 4

| Active compound | (Myzus test) Active compound concentration in % | Degree of destruction in % after 1 day |
| --- | --- | --- |
| (c) (known) | 0.1 | 100 |
|  | 0.01 | 0 |
| (1) | 0.1 | 100 |
|  | 0.01 | 100 |
| (2) | 0.1 | 100 |
|  | 0.01 | 95 |
|  | 0.001 | 25 |
| (5) | 0.1 | 100 |
|  | 0.01 | 100 |
| (7) | 0.1 | 100 |
|  | 0.01 | 100 |

EXAMPLE 13

Tetranychus test (resistant)

Solvent: 3 parts by weight of acetone

Emulsifier: 1 part by weight of alkylaryl polyglycol ether

To produce a suitable preparation of active compound, 1 part by weight of the active compound was mixed with the stated amount of solvent containing the stated amount of emulsifier and the concentrate was diluted with water to the desired concentration.

Bean plants (Phaseolus vulgaris), which had a height of approximately 10–30 cm., were sprayed with the preparation of the active compound until dripping wet. These bean plants were heavily infested with the common or two-spotted spider mite (Tetranychus urticae) in all stages of development.

After the specified periods of time, the effectiveness of the preparation of active compound was determined by counting the dead mites. The degree of destruction thus obtained was expressed as a percentage: 100% means that all the spider mites were killed whereas 0% means that none of the spider mites were killed.

The active compounds, the concentrations of the active compounds, the evaluation times and the results can be seen from the following Table 5.

Table 5

| Active compound | (Tetranychus test/resistant) Active compound concentration in % | Degree of destruction in % after 2 days |
| --- | --- | --- |
| (a) (known) | 0.1 | 0 |
| (b) (known) | 0.1 | 0 |
| (c) (known) | 0.1 | 0 |
| (d) (known) | 0.1 | 0 |
| (2) | 0.1 | 100 |

It will be appreciated that the instant specification and examples are set forth by way of illustration and not limitation, and that various modifications and changes may be made without departing from the spirit and scope of the present invention.

What is claimed is:

1. A (thiono)thiol-phosphoric-(phosphonic) acid ester of the formula

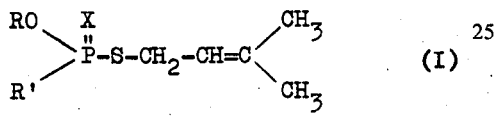

(I)

in which
R is lower alkyl,
R' is lower alkyl, lower alkoxy, lower alkylmercapto or phenyl, and
X is oxygen or sulfur.

2. A compound according to claim 1 in which R is alkyl of one to three carbon atoms, and R' is alkyl, alkoxy or alkylmercapto of one to three carbon atoms.

3. The compound according to claim 1 wherein such compound is ethyl-O-ethyl-S-[3-methyl-buten-(2)-yl]-thionothiolphosphonic acid ester of the formula

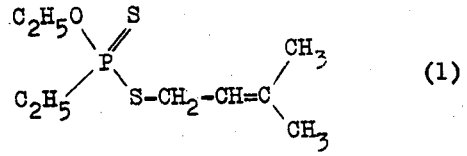

(1)

4. The compound according to claim 1 wherein such compound is O-ethyl-S-n-propyl-S-[3-methyl-buten-(2)-yl]-thionothiolphosphoric acid ester of the formula

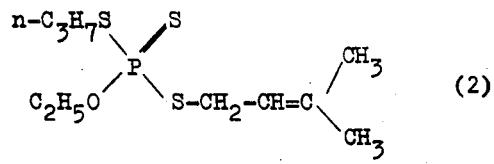

(2)

5. The compound according to claim 1 wherein such compound is O,O-dimethyl-S-[3-methyl-buten-(2)-yl]-thionothiolphosphoric acid ester of the formula

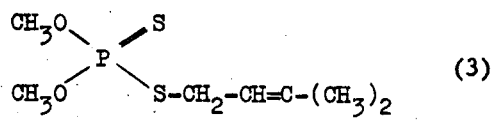

(3)

6. The compound according to claim 1 wherein such compound is methyl-O-ethyl-S-[3-methyl-buten-(2)-yl]-thionothiolphosphonic acid ester of the formula

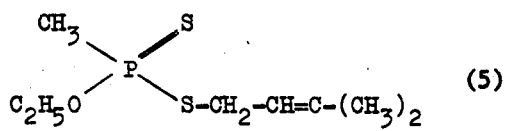

(5)

7. The compound according to claim 1 wherein such compound is ethyl-O-ethyl-S-[3-methyl-buten-(2)-yl]-thiolphosphonic acid ester of the formula

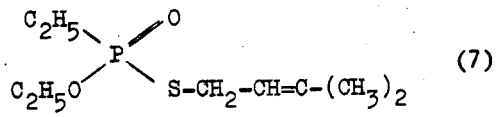

(7)

* * * * *